(12) United States Patent  
Mori

(10) Patent No.: US 8,851,411 B2  
(45) Date of Patent: Oct. 7, 2014

(54) REEL AND RECORDING TAPE CARTRIDGE

(75) Inventor: Yasuhiro Mori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 295 days.

(21) Appl. No.: 12/972,549

(22) Filed: Dec. 20, 2010

(65) Prior Publication Data

US 2011/0155836 A1 Jun. 30, 2011

(30) Foreign Application Priority Data

Dec. 25, 2009 (JP) ................................. 2009-296122

(51) Int. Cl.
  *G11B 23/107* (2006.01)
  *G11B 23/04* (2006.01)
  *G11B 23/037* (2006.01)

(52) U.S. Cl.
  CPC ............ *G11B 23/044* (2013.01); *G11B 23/107* (2013.01); *G11B 23/037* (2013.01)
  USPC ................... 242/348.2; 242/608.8; 242/609.4

(58) Field of Classification Search
  CPC ..... G11B 23/107; G11B 23/043; G03B 23/02
  USPC ........ 242/348, 348.2, 608, 608.8, 609, 609.4, 242/610.4, 611.1
  See application file for complete search history.

(56) References Cited

U.S. PATENT DOCUMENTS

| | | | |
|---|---|---|---|
| 6,349,015 B1 * | 2/2002 | Hayashi | 360/132 |
| 6,651,917 B2 * | 11/2003 | Momoi et al. | 242/348 |
| 7,104,486 B2 * | 9/2006 | Hiraguchi | 242/348 |
| 7,401,750 B2 * | 7/2008 | Hiraguchi | 242/611.1 |

(Continued)

FOREIGN PATENT DOCUMENTS

| | | |
|---|---|---|
| JP | 08-212751 | 8/1996 |
| JP | 09-69270 | 3/1997 |

(Continued)

OTHER PUBLICATIONS

Partial English language translation of the following: Office action dated May 14, 2013 from the Japanese Patent Office in a Japanese patent application corresponding to the instant patent application. This office action translation is submitted now in order to supplement the understanding of patent documents JP2008-108322, JP2008-102979, JP08-212751, JP10-188519 and JP09-069270 which are cited in the office action and are being disclosed in the instant Information Disclosure Statement.

(Continued)

*Primary Examiner* — William A Rivera
(74) *Attorney, Agent, or Firm* — SOLARIS Intellectual Property Group, PLLC

(57) ABSTRACT

A reel has: a hub that has a cylindrical tube portion, an extending portion that extends from an inner peripheral edge of a lower end portion of the cylindrical tube portion toward a radial direction inner side, and an abutting portion provided at the extending portion; an upper flange; a lower flange; and a floor wall that is provided integrally at the radial direction inner side of the lower flange, and that has a position restricting portion that restricts a radial direction position of the abutting portion from the radial direction inner side. A region of the floor wall which is further toward the radial direction outer side than the position restricting portion is welded to the extending portion.

9 Claims, 13 Drawing Sheets

(56) References Cited

U.S. PATENT DOCUMENTS

| | | | |
|---|---|---|---|
| 8,006,930 B2 * | 8/2011 | Mori et al. | 242/608.8 |
| 2005/0236512 A1 * | 10/2005 | Hiraguchi | 242/608.8 |
| 2008/0277519 A1 * | 11/2008 | Mori et al. | 242/348 |
| 2010/0038466 A1 * | 2/2010 | Takenoshita et al. | 242/348 |

FOREIGN PATENT DOCUMENTS

| | | |
|---|---|---|
| JP | 10-188519 | 7/1998 |
| JP | 2007-305222 A | 11/2007 |
| JP | 2008-102979 | 5/2008 |
| JP | 2008-108322 | 5/2008 |

OTHER PUBLICATIONS

Office action dated Jun. 12, 2014 from the Chinese Patent Office in a Chinese patent application corresponding to the instant patent application.

* cited by examiner

REEL AND RECORDING TAPE CARTRIDGE

CROSS-REFERENCE TO RELATED APPLICATION

This application claims priority under 35 USC 119 from Japanese Patent Application No. 2009-296122, filed on Dec. 25, 2009, the disclosure of which is incorporated by reference herein.

BACKGROUND OF THE INVENTION

1. Field of the Invention

The present invention relates to a reel on which is wound a recording tape, such as a magnetic tape or the like, that is used as a recording/playback medium mainly of computers or the like, and to a recording tape cartridge that is equipped with the reel.

2. Description of the Related Art

There have conventionally been known recording tape cartridges in which a recording tape, such as a magnetic tape or the like that is used as a data recording/playback medium (for data backup) of computers or the like, is wound on a reel formed of a synthetic resin, and the reel is singly accommodated within a case. The reel of the recording tape cartridge is formed by, for example, an upper flange and a hub being molded integrally, and a lower flange being welded to the lower end portion of the hub (see, for example, Japanese Patent Application Laid-Open (JP-A) No. 2007-305222).

Recording tape cartridges are generally stored for a long time period. Therefore, there is the problem that the hub deforms inwardly in the radial direction due to the pressure caused by the tight winding of the recording tape, and, due to this deformation, the recording tape that is wound around the hub deforms. Various means have conventionally be proposed in order to overcome this problem, but there is still room for improvement in means for suppressing deformation of a recording tape caused by the tight winding thereof.

SUMMARY OF THE INVENTION

In view of the above-described circumstances, an object of the present invention is to provide a reel that can suppress deformation of a recording tape that is caused by the tight winding thereof, and a recording tape cartridge equipped with the reel.

A reel relating to a first aspect of the present invention has: a hub that is formed of resin and that has a cylindrical tube portion on whose outer peripheral surface a recording tape is wound, an extending portion that extends from an inner peripheral edge of a lower end portion of the cylindrical tube portion toward a radial direction inner side, and an abutting portion provided at the extending portion; an upper flange that is provided integrally so as to extend from an outer peripheral edge of an upper end portion of the cylindrical tube portion toward a radial direction outer side; a lower flange that is formed of resin, and that is provided at the radial direction outer side of an outer peripheral edge of the lower end portion of the cylindrical tube portion so as to face the upper flange; and a floor wall that is provided integrally at the radial direction inner side of the lower flange, and that has a position restricting portion that restricts a radial direction position of the abutting portion from the radial direction inner side, and a region of the floor wall, which region is further toward the radial direction outer side than the position restricting portion, is welded to the extending portion.

In accordance with the first aspect of the present invention, the position restricting portion is provided at the floor wall of the lower flange. When the floor wall is welded to the hub, the position restricting portion restricts, from the radial direction inner side, the radial direction position of the abutting portion that is provided at the extending portion of the hub. Further, a region that is further toward the radial direction outer side than this position restricting portion is welded to the extending portion of the hub. Namely, the radial direction positioning of the floor wall of the lower flange with respect to the hub is carried out at the radial direction inner side of the region of welding to the hub.

Accordingly, at the radial direction outer side of the region welded to the floor wall of the lower flange, deformation of the hub toward the radial direction inner side thereof is not restricted by the floor wall of the lower flange. Namely, even if the hub deforms toward the radial direction inner side due to pressure caused by tight winding of the recording tape, that deformation is not hindered by the floor wall of the lower flange. Accordingly, in the heightwise direction of the hub (the transverse direction of the recording tape), the hub is uniformly deformed vertically. Therefore, when the recording tape is stored over a long period of time or the like, deformation of the recording tape that is in a state of being wound around the hub can be suppressed, and deterioration in the performance of the recording tape can be prevented.

In the reel of the first aspect of the present invention, the abutting portion may be a radial direction inner side end surface of the extending portion, and, due to the position restricting portion being inserted through a pass-through hole that is structured by the end surface, the position restricting portion may restrict a radial direction position of the end surface from the radial direction inner side.

In accordance with the above-described structure, the shape of the abutting portion can be simplified.

Further, in the reel of the above-described structure, an inclined surface that guides the end surface may be formed at an upper portion of the position restricting portion.

In this case, positioning, in the radial direction, of the lower flange with respect to the hub can be carried out easily.

Further, in the reel of the first aspect of the present invention, a gear for rotating and driving may be formed at a bottom surface of the floor wall, and a welding region at the floor wall may be further toward the radial direction inner side than the gear for rotating and driving.

In accordance with the above-described structure, deformation of the hub at the radial direction outer side of the gear for rotating and driving is not hindered. Accordingly, in the heightwise direction of the hub (the transverse direction of the recording tape), the hub is uniformly deformed vertically, i.e., uniformly deformed at the upper and lower sides thereof, and the balance of rigidity in the vertical direction is maintained.

In the reel of the above-described structure, a reel plate formed of metal may be fixed to the floor wall at the radial direction inner side of the gear for rotating and driving, and the welding region at the floor wall may be above a region where the reel plate exists.

In accordance with the above-described structure, deformation of the hub at the radial direction outer side of the reel plate is not impeded. Accordingly, in the heightwise direction of the hub (the transverse direction of the recording tape), the hub is uniformly deformed vertically, and the balance of rigidity in the vertical direction is maintained.

In the reel of the first aspect of the present invention, a reference surface, that prescribes a heightwise direction position of the hub, may be formed at the floor wall.

In accordance with the above-described structure, positioning of the lower flange with respect to the hub in the heightwise direction can be carried out accurately.

A recording tape cartridge of a second aspect of the present invention includes: the reel of the first aspect of the present invention on which a recording tape is wound; a case that singly accommodates the reel; and a leader member attached to an end portion of the recording tape and able to be pulled-out from an opening formed in the case.

In accordance with the second aspect of the present invention, when the recording tape cartridge is stored over a long period of time or the like, deformation of the recording tape that is in a state of being wound around the hub can be suppressed, and deterioration in the performance of the recording tape can be prevented.

As described above, in accordance with the present invention, there can be provided a reel that can suppress deformation of a recording tape that is caused by tight winding, and a recording tape cartridge equipped with the reel.

DETAILED DESCRIPTION OF THE INVENTION

Figure 1A:
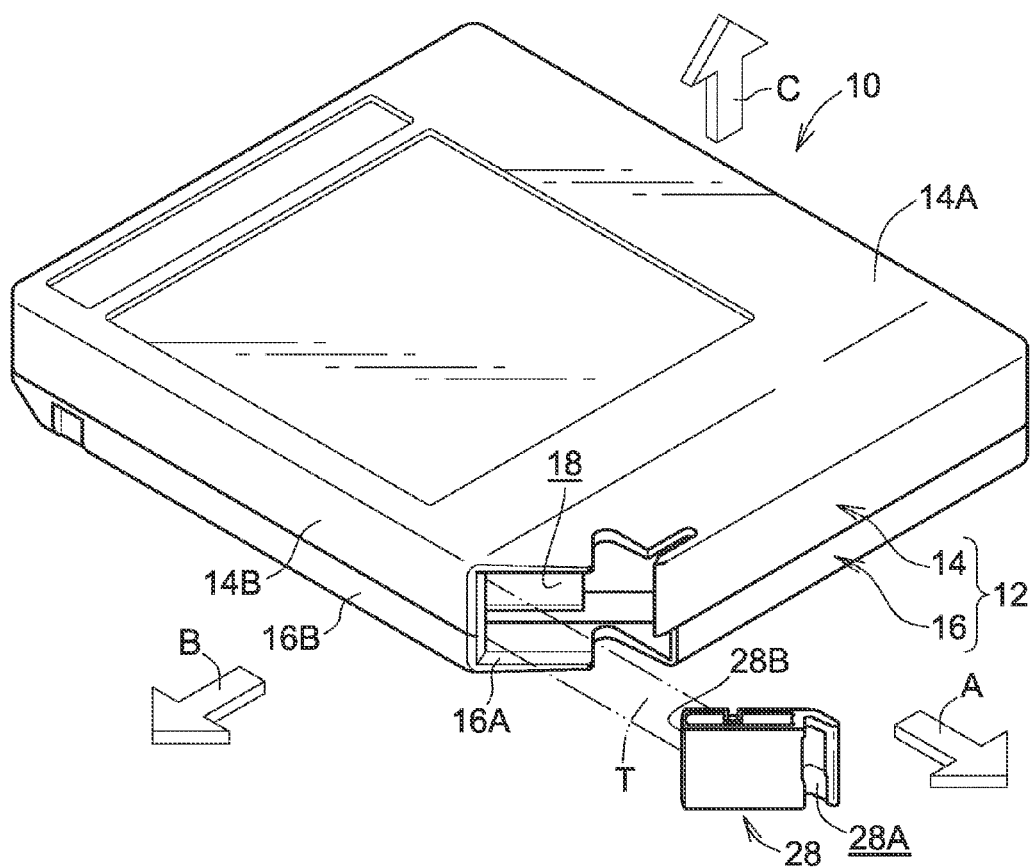
FIG. 1A is a schematic perspective view of a recording tape cartridge seen from above.
Figure 1B:
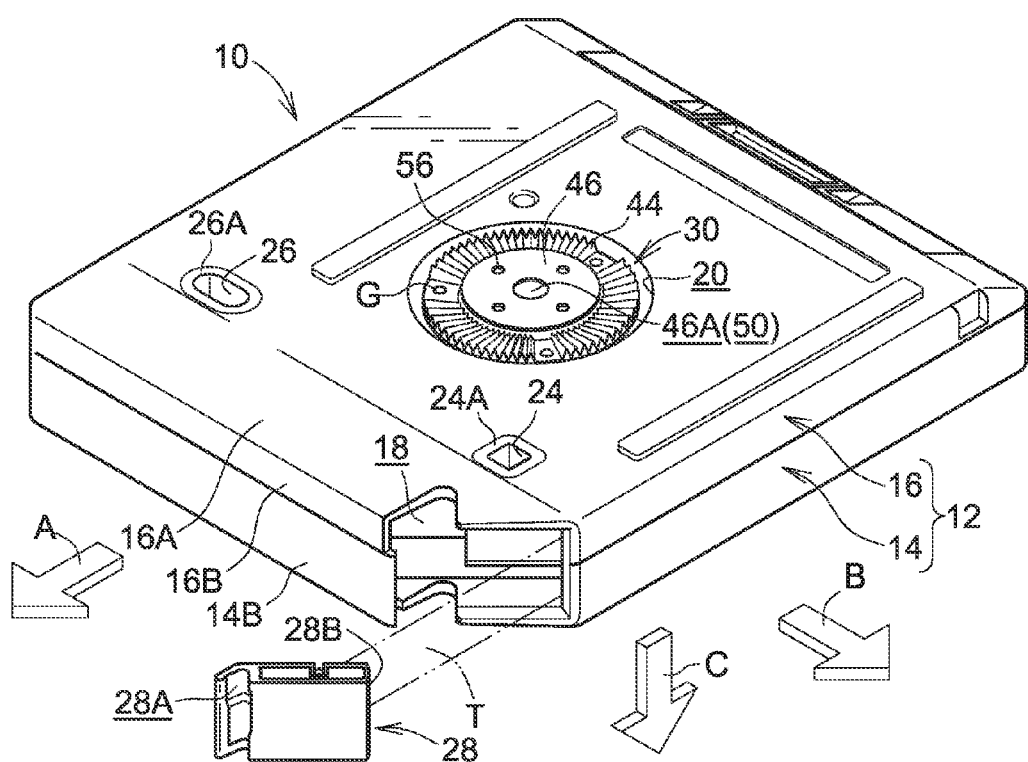
FIG. 1B is a schematic perspective view of the recording tape cartridge seen from below.

Hereinafter, an exemplary embodiment of the present invention is described in detail on the basis of the drawings. First, a recording tape cartridge 10, that is equipped with a reel 30 relating to the present exemplary embodiment, is described. Note that, for convenience of explanation, the arrow A direction in FIG. 1A and FIG. 1B is the forward direction of the recording tape cartridge 10 (the direction of loading the recording tape cartridge 10 into a drive device), the arrow B direction is the right direction of the recording tape cartridge 10, and the arrow C direction is the upward direction of the recording tape cartridge 10 and the reel 30.

As shown in FIG. 1A through FIG. 3, the recording tape cartridge 10 has a case 12 made of resin. The case 12 is structured by an upper case 14 and a lower case 16 being joined together. Specifically, the upper case 14 is structured such that a substantially frame-shaped peripheral wall 14B stands erect along the outer edge of a ceiling plate 14A that is substantially rectangular in plan view. The lower case 16 is structured such that a substantially frame-shaped peripheral wall 16B stands erect along the outer edge of a floor plate 16A that has a configuration substantially corresponding to that of the ceiling plate 14A. The case 12 is formed substantially in the shape of a rectangular box by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A, and the peripheral wall 16B are respectively cut-out such that an opening 18, that is inclined with respect to the direction of loading, is formed. Further, a circular gear opening 20 that passes through the floor plate 16A is provided in the substantially central portion of the floor plate 16A, and is for exposing a reel gear 44 that is described below. At the edge portion of the gear opening 20 at the floor plate 16A, an annular rib 22 projects toward the interior of the case 12, and is for positioning and dust-proofing the reel 30 that is described below.

A pair of positioning holes 24, 26 open in a vicinity of the front end of the outer surface of the floor plate 16A of the case 12. The pair of positioning holes 24, 26 are provided in the form of pockets within protruding portions (not shown) that stand erect from the floor plate 16A toward the inner side of the case 12. The positioning holes 24, 26 are disposed so as to be spaced apart from one another on an imaginary line in the arrow B direction.

The positioning hole 24, that is at the side closer to the opening 18, is formed, in bottom view, substantially in the shape of a square that circumscribes a positioning pin (not shown) of a drive device. The positioning hole 26 is formed as a long hole that is long along the aforementioned imaginary line and whose width corresponds to the diameter of a positioning pin. Accordingly, when the recording tape cartridge 10 is loaded into a drive device and positioning pins are inserted into the positioning holes 24, 26 respectively, the recording tape cartridge 10 is positioned accurately in the horizontal direction (the left/right direction and front/back direction) within the drive device.

The portions of the floor plate 16A around the positioning holes 24, 26 are reference surfaces 24A, 26A that are finished so as to be smoother than the other portions (the design surface) of the floor plate 16A. When the positioning pins are inserted into the positioning holes 24, 26, the reference surfaces 24A, 26A abut reference surfaces (not shown) of the drive device that are provided around the positioning pins. Due thereto, the recording tape cartridge 10 is accurately positioned in the vertical direction within the drive device.

Figure 2:
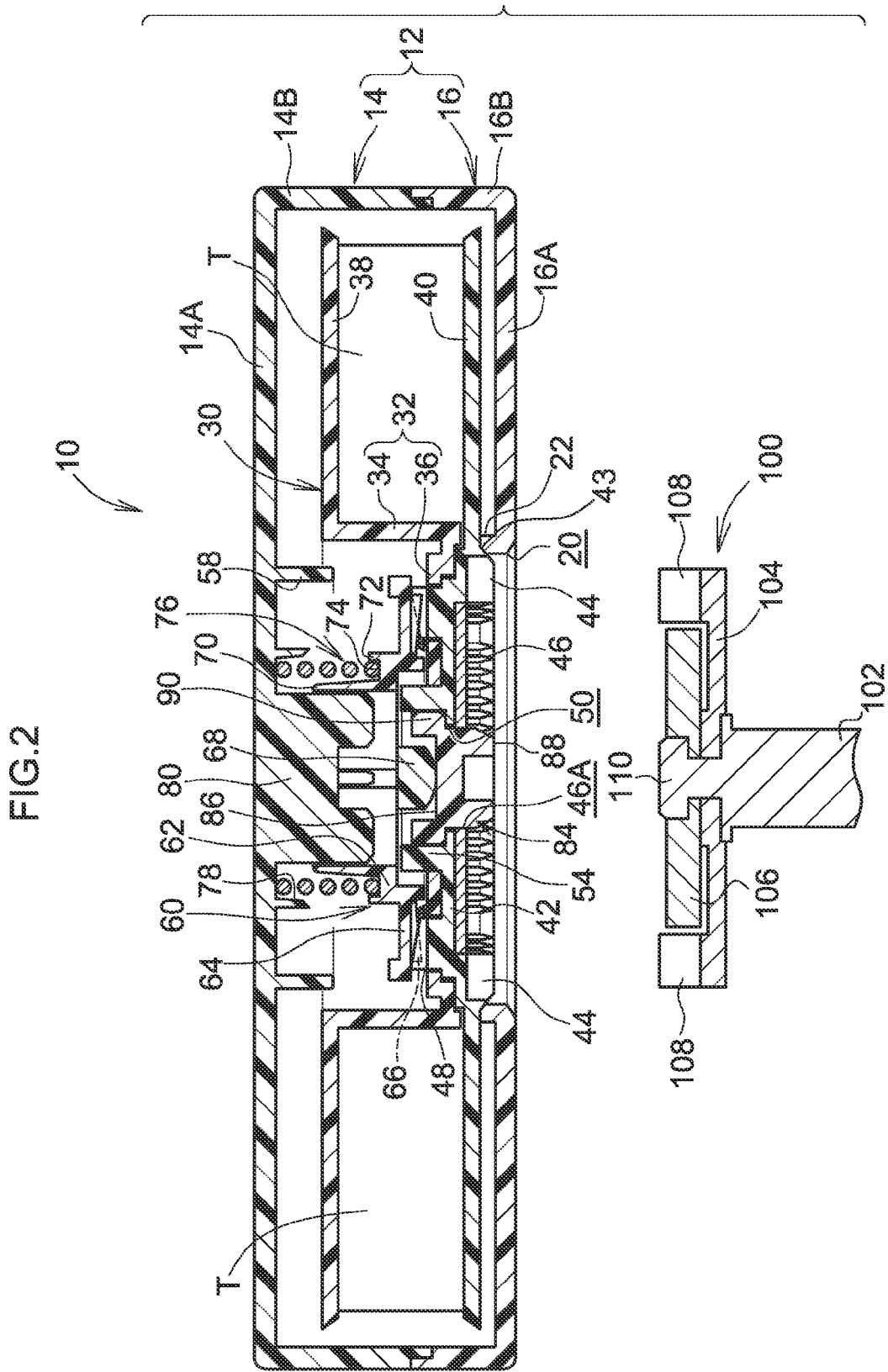
FIG. 2 is a schematic sectional view at a time when a reel of the recording tape cartridge is at a rotation locked position.
Figure 3:
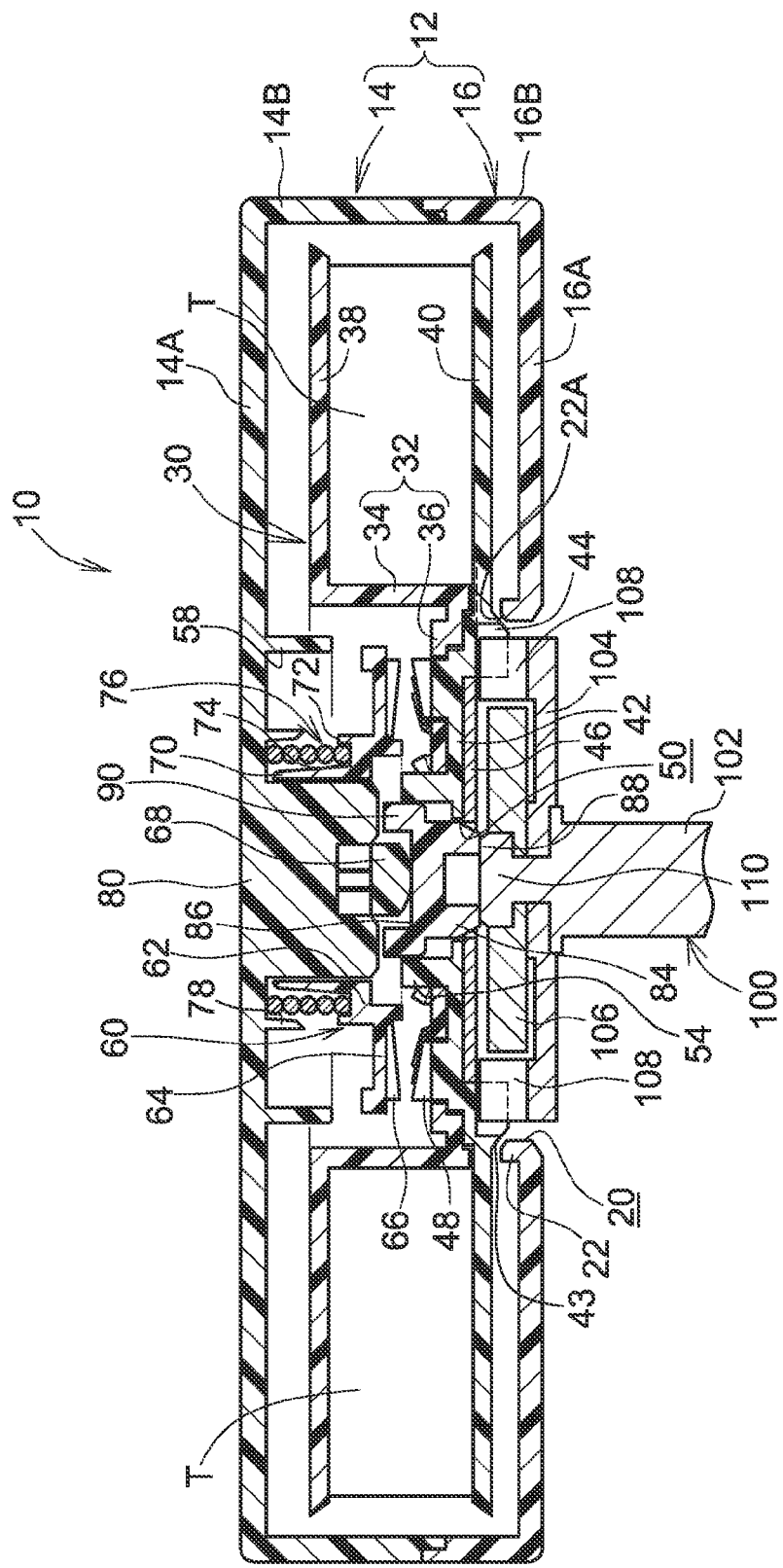
FIG. 3 is a schematic sectional view at a time when the reel of the recording tape cartridge is at a rotation permitted position.

As shown in FIG. 2 and FIG. 3, the reel 30 (details thereof is described below) that is formed of resin is singly and rotatably accommodated in the case 12. A recording tape T, such as a magnetic tape or the like, is wound on the reel 30. As shown in FIG. 1A and FIG. 1B, a leader block 28 serving as a leader member is attached to the distal end of the recording tape T. When the recording tape cartridge 10 is not being used, the leader block 28 is accommodated and held at the inner side of the opening 18 of the case 12. In this state, the leader block 28 closes-off the opening 18 and impedes entry of dust and the like into the case 12.

An engaging recess 28A is formed in the distal end of the leader block 28. When the recording tape T is to be pulled-out within the drive device, the leader block 28 is pulled-out from the case 12 by a pull-out means (not shown) that engages with the engaging recess 28A, and is guided to a take-up reel (not shown) of the drive device. Moreover, the end surface of the leader block 28 at the side opposite the engaging recess 28A is an arc-shaped surface 28B. By being fit-into the reel hub of the take-up reel, the arc-shaped surface 28B structures a portion of the take-up surface on which the recording tape T is taken-up.

Figure 4:
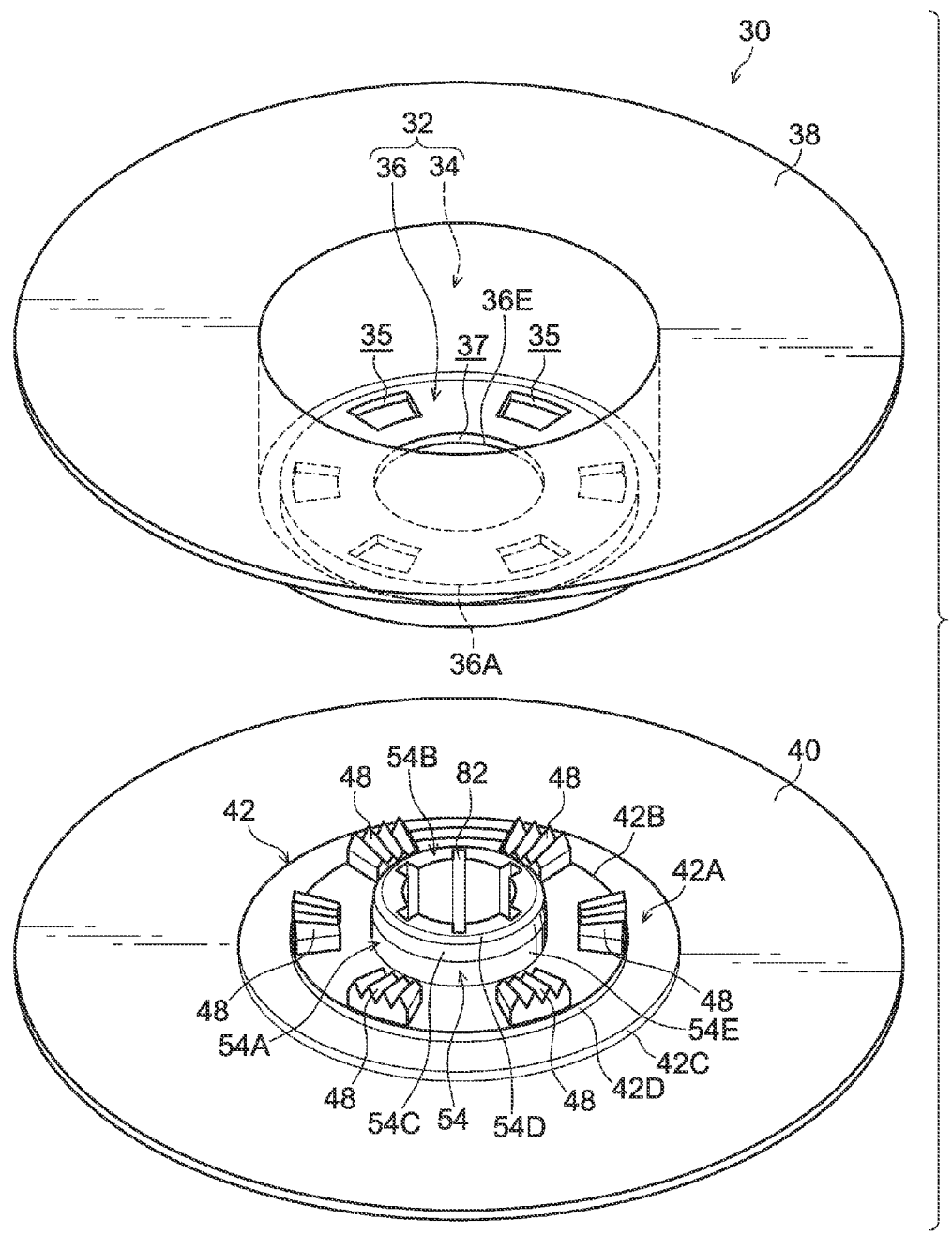
FIG. 4 is a schematic exploded perspective view of the reel seen from above.
Figure 5:
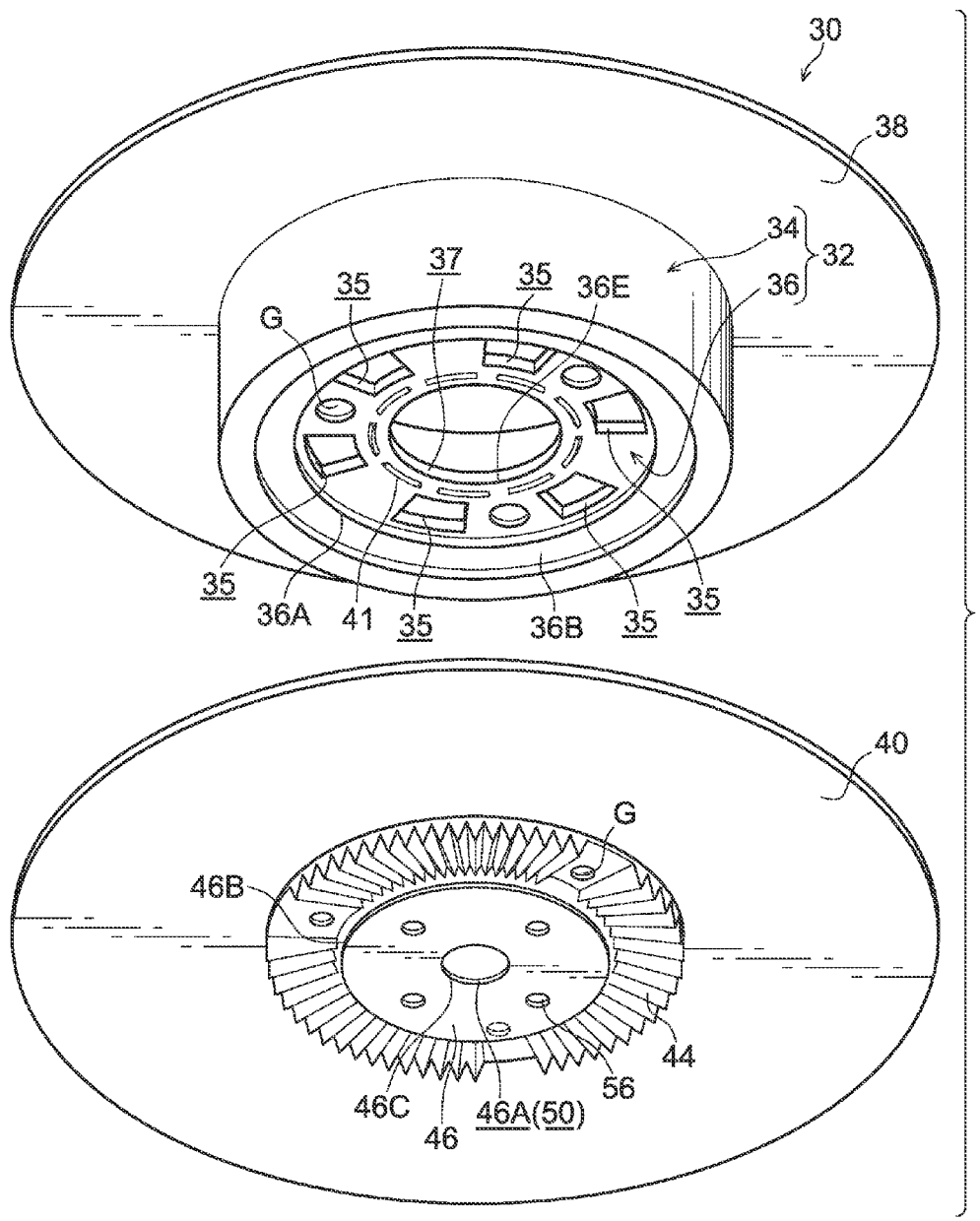
FIG. 5 is a schematic exploded perspective view of the reel seen from below.
Figure 6:
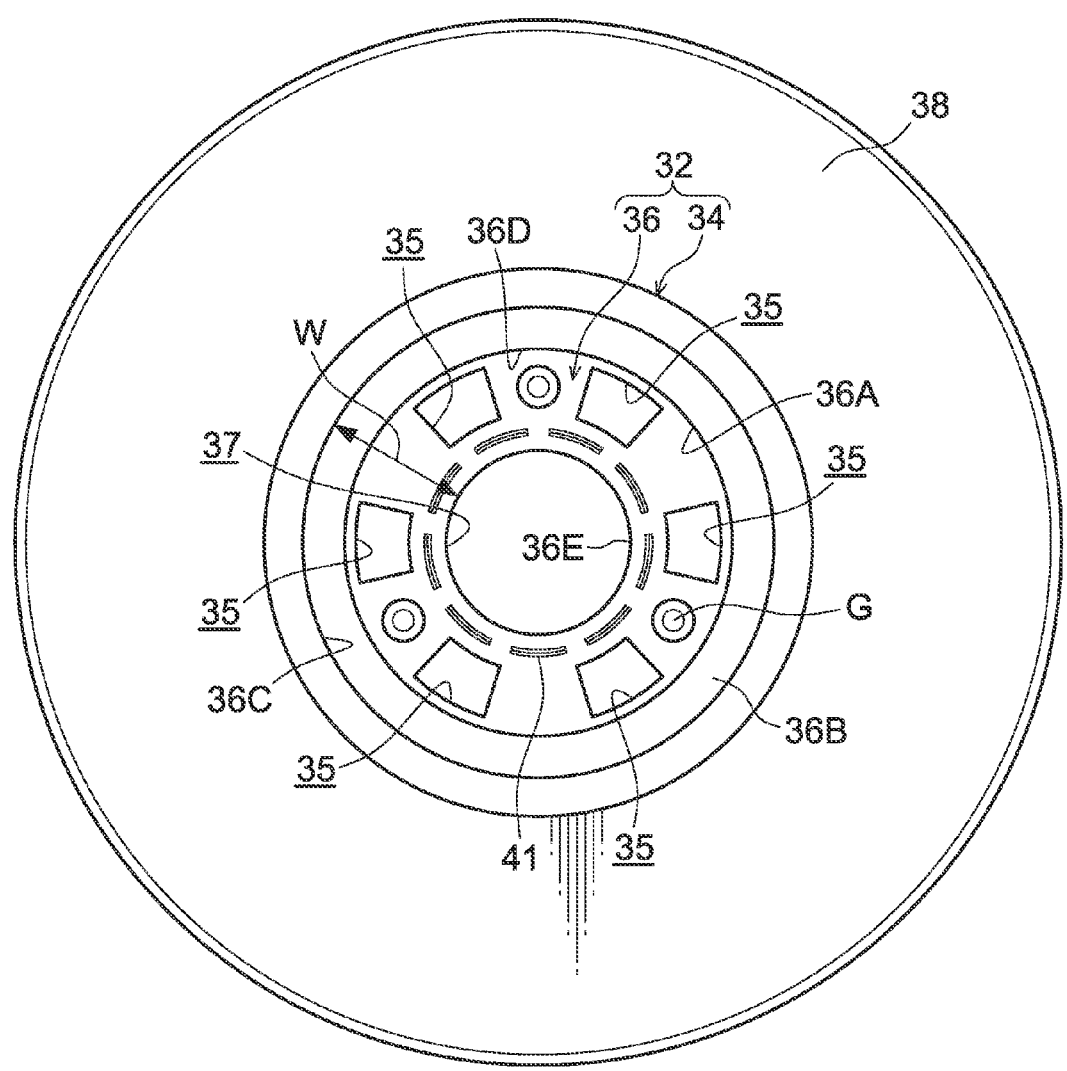
FIG. 6 is a schematic bottom view of an upper flange and a reel hub.
Figure 9:
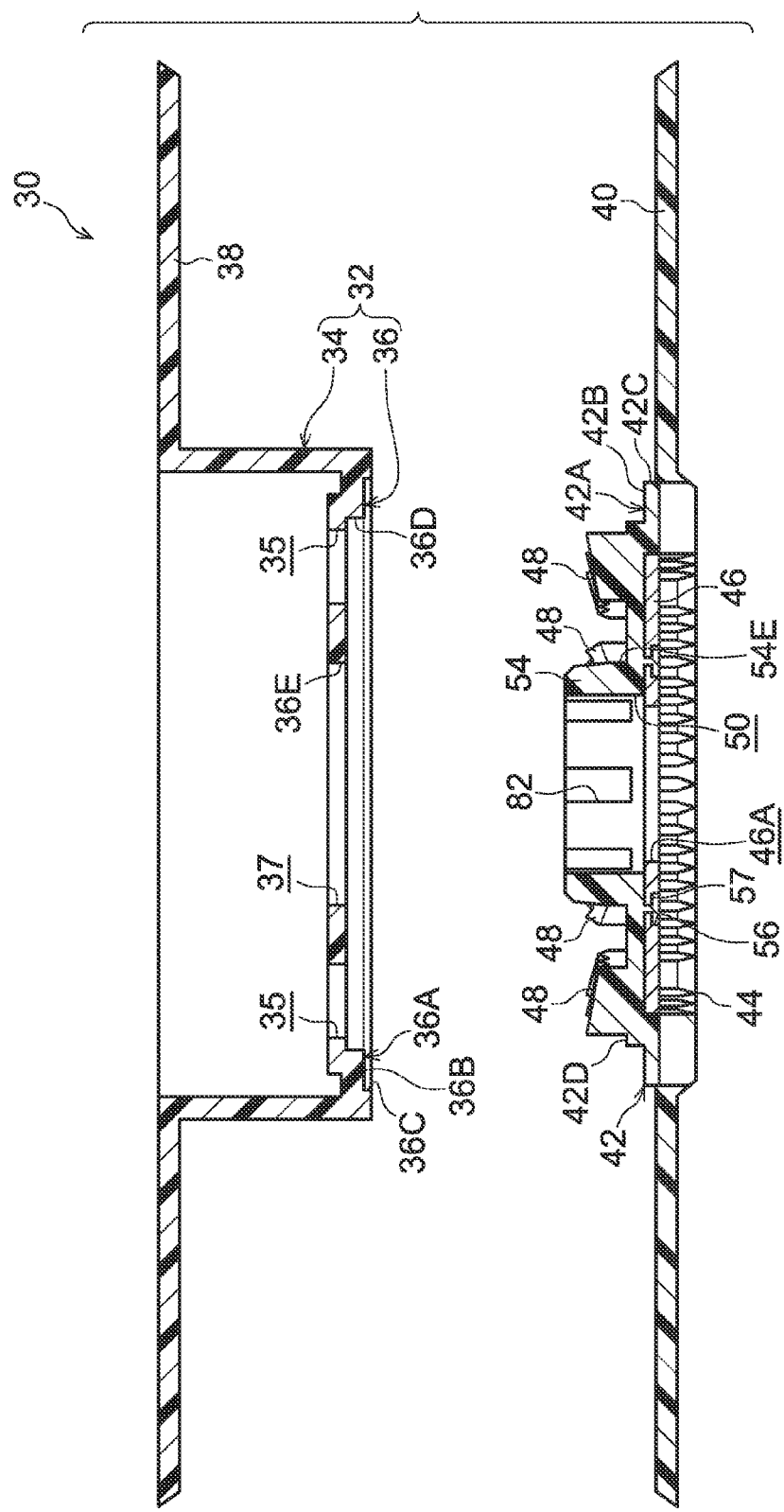
FIG. 9 is a schematic exploded sectional view of the reel.

Next, the reel 30 and a braking means, that impedes rotation of the reel 30 when the reel 30 is not in use, is described. As shown in FIG. 4 through FIG. 6 and in FIG. 9 through FIG. 11, the reel 30 has a substantially cylindrical-tube-shaped reel hub 32 that structures the axially central portion thereof. The reel hub 32 has a cylindrical tube portion 34 and an annular extending portion 36. The cylindrical tube portion 34 has a plate thickness Dl (see FIG. 11), and the recording tape T is wound around the outer peripheral surface thereof. The annular extending portion 36 (a floor wall that has a pass-through hole 37 at the center thereof) extends in an annular shape integrally from the inner peripheral edge at the lower end portion of the cylindrical tube portion 34, by a width W (see FIG. 6) toward the center of the reel hub 32 (inwardly in the radial direction).

Namely, the pass-through hole 37, through which is inserted a boss portion 54 for a clutch (position restricting portion) that is formed at a floor wall 42 of a lower flange 40 that is described below, is formed in the center of the floor wall of the reel hub 32. The width W of the annular extending portion 36 is substantially equal to a length that is ½ (the radius) of the inner diameter of the reel hub 32 (the cylindrical tube portion 34) minus ½ (the radius) of the outer diameter of the boss portion 54 for a clutch.

Concretely, the clearance between a radial direction inner side end surface 36E (an abutting portion: see FIG. 4, FIG. 11, and the like) of the annular extending portion 36 and an outer peripheral surface 54E (see FIG. 4, FIG. 11, and the like) at a lower portion 54A side of the boss portion 54 for a clutch is, for example, 0.03 mm as a radius. Accordingly, the radial direction position of the lower flange 40 with respect to the reel hub 32 is prescribed (positioned) due to the boss portion 54 for a clutch being inserted through the pass-through hole 37.

Further, as shown in FIG. 4 through FIG. 6, plural (six in the illustrated structure) pass-through holes 35 are formed at uniform intervals in the peripheral direction in the annular extending portion 36 that is the floor wall. These pass-through holes 35 are hole portions through which engaging gears 48 (to be described below), that are formed at the floor wall 42 of the lower flange 40, are inserted. The width W of the annular extending portion 36 is a size such that the pass-through holes 35 can be formed therein. Due to the engaging gears 48 being inserted through the pass-through holes 35, rotation of the reel hub 32 with respect to the lower flange 40 is impeded. Namely, the position of the lower flange 40 in the peripheral direction with respect to the reel hub 32 is prescribed due thereto.

Gate marks G, that are injection openings for a resin material for molding, are formed at portions (three portions in the illustrated structure) of the annular extending portion 36 between the pass-through holes 35. A step portion 36A, that is such that the planar portion in which the pass-through holes 35 are formed swells-upward in the form of a step, is formed in an annular form at the radial direction outer side of the pass-through holes 35 and the radial direction inner side of the inner peripheral edge of the cylindrical tube portion 34. Note that a plate thickness D2 (see FIG. 11) of the annular extending portion 36 except for the step portion 36A is smaller than the plate thickness Dl of the cylindrical tube portion 34.

The upper flange 38 is provided so as to extend integrally and coaxially from the outer peripheral edge of the upper end portion of the cylindrical tube portion 34 toward the radial direction outer side. Namely, the reel 30 is structured such that the reel hub 32 and the upper flange 38 are molded integrally of a resin material for molding, and the lower flange 40 (the floor wall 42) is joined (welded) to the lower end portion (the annular extending portion 36) of the reel hub 32.

As shown in FIG. 4, FIG. 5, and FIG. 7 through FIG. 12, the outer diameter of the lower flange 40 is made to be the same as the outer diameter of the upper flange 38. The floor wall 42, to whose bottom surface is fixed a reel plate 46 that is described below, is formed integrally at the axially central portion (the radial direction inner side) of the lower flange 40. Namely, at the reel 30, the radial direction outer side of the outer peripheral edge at the lower end portion of the cylindrical tube portion 34 is the substantial lower flange 40, and the portion further toward the radial direction inner side than this outer peripheral edge is the floor wall 42 of the lower flange 40.

A step portion 42A that is annular is formed at the top surface of the floor wall 42 that corresponds to the step portion 36A of the annular extending portion 36. A top surface 42B of the step portion 42A is a reference surface in the heightwise direction. Due to the top surface 42B abutting a bottom surface 36B at the step portion 36A of the annular extending portion 36, the heightwise direction (vertical direction) position of the reel hub 32 (the upper flange 38) with respect to the lower flange 40 is prescribed (positioned).

Figure 11:
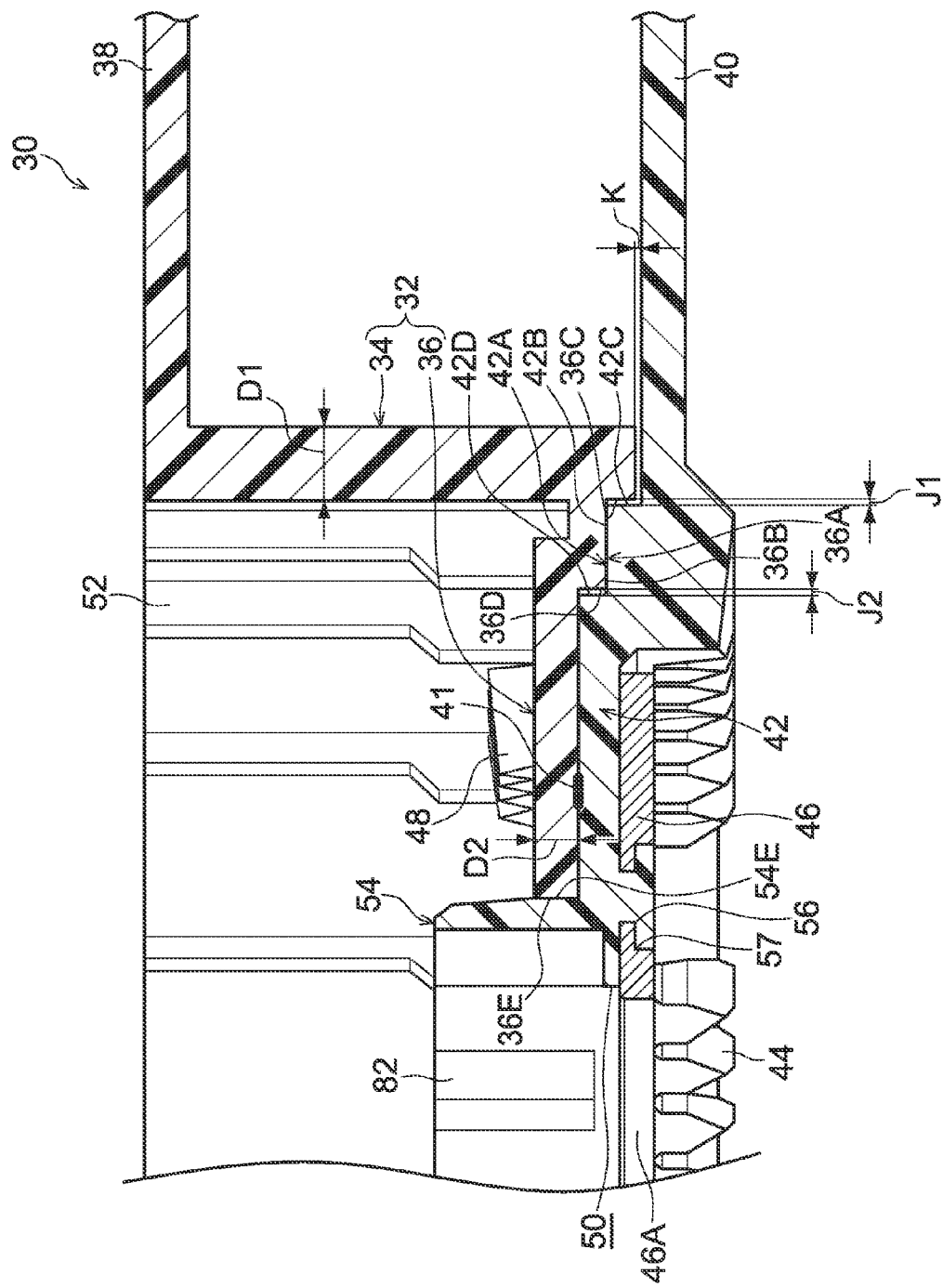
FIG. 11 is a partial, enlarged schematic sectional view of the reel.

Note that, as shown in FIG. 11, predetermined clearances J1, J2 are formed between an inner peripheral surface 36C at the radial direction outer side of the step portion 36A and an outer peripheral surface 42C at the radial direction outer side of the step portion 42A, and between an inner peripheral surface 36D at the radial direction inner side of the step portion 36A and an outer peripheral surface 42D at the radial direction inner side of the step portion 42A, respectively. The size of these clearances J1, J2 is, for example, greater than or equal to 0.2 mm each. The values of the respective clearances J1, J2 may be the same or may be different.

Further, as shown in FIG. 5 through FIG. 11, plural (nine in the illustrated structure) energy directors (hereinafter called "EDs") 41, that are ribs for ultrasonic welding, project-out so as to be separated by predetermined intervals (uniform intervals) in an annular form at a region further toward the radial direction outer side than the boss portion 54 for a clutch, and more specifically, at predetermined positions of the bottom surface of the annular extending portion 36 (between the pass-through hole 37 and the pass-through holes 35 in the radial direction), which predetermined positions are within a region where the reel plate 46, that is provided at the radial direction inner side of the reel gear 44 that is described below, exists (between an outer peripheral edge portion 46B and an inner peripheral edge portion 46C of the reel plate 46) and overlap a region (a flat region) other than small holes 56 that is described below.

Due to the EDs 41 being fused by ultrasonic waves, the top surface of the floor wall 42 of the lower flange 40 is welded to the bottom surface of the annular extending portion 36 of the reel hub 32. The recording tape T can be wound around the outer peripheral surface of the reel hub 32 (the cylindrical tube portion 34) between the opposing surfaces of the upper flange 38 and the lower flange 40.

At the time of this welding, the top surface 42B of the step portion 42A abuts the bottom surface 36B of the step portion 36A. However, the bottom end portion of the reel hub 32 (the cylindrical tube portion 34) does not abut the top surface of the lower flange 40 (a slight clearance K (see FIG. 10) is formed between the bottom end portion of the cylindrical tube portion 34 and the top surface of the lower flange 40).

Figure 8:
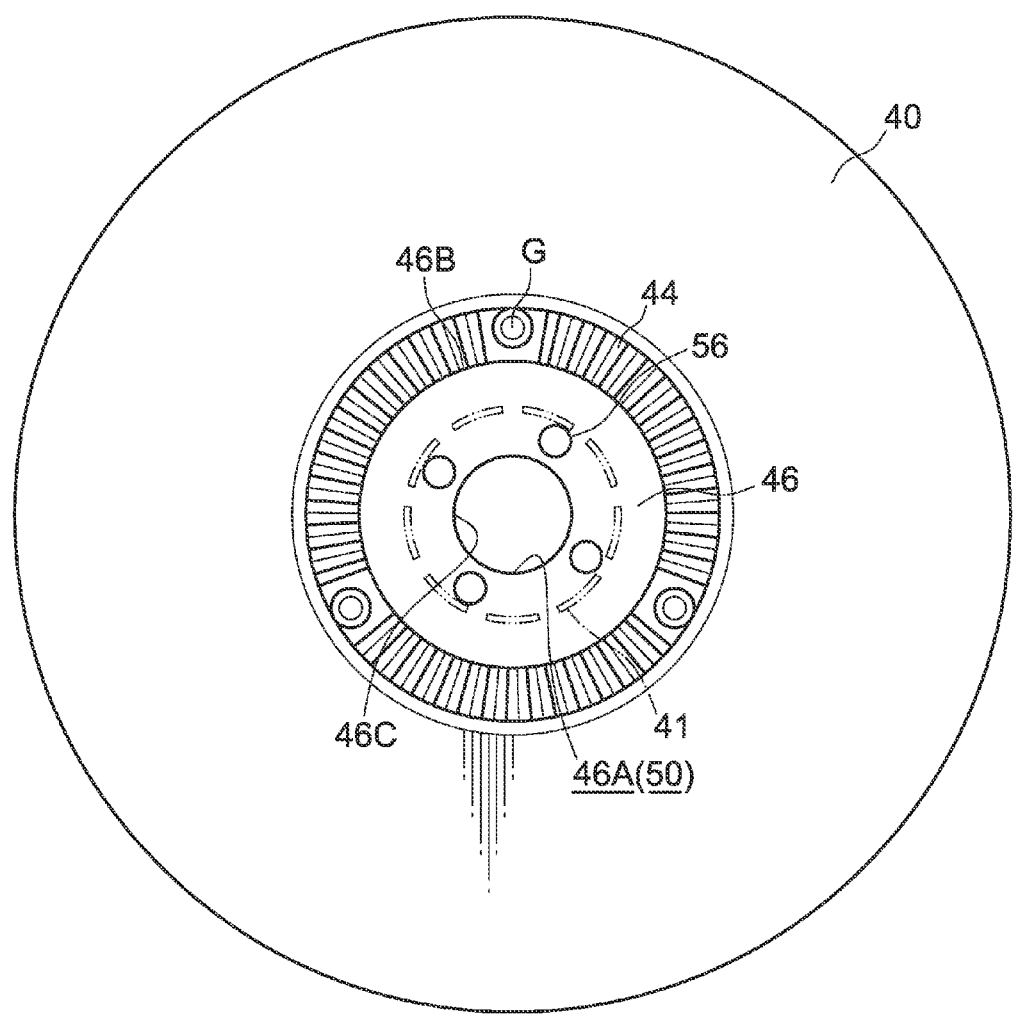
FIG. 8 is a schematic bottom view of the lower flange.

Further, as shown in detail in FIG. 8, the reel gear 44, that serves as a gear for rotating and driving and is formed in an annular shape that is coaxial with the reel hub 32 when joined to the reel hub 32, is formed at the bottom surface (outer surface) of the floor wall 42 of the lower flange 40. The reel gear 44 can mesh-together with a driving gear 108 that is provided at the distal end of a rotating shaft 100 of the drive device shown in FIG. 2 and FIG. 3.

The tooth crests of the reel gear 44 project-out further downward than the bottom surface of the lower flange 40, and the tooth bottoms are positioned further upward than the bottom surface of the lower flange 40. The radial direction outer end portions of the respective teeth are taper portions 43 (see FIG. 2, FIG. 3) that are continuous with the lower flange 40 from the central portions in the heightwise direction of the teeth to the tooth bottoms thereof. Note that a plurality (three in the structure shown in FIG. 8) of the gate marks G, that are injection openings for a resin material for molding, are formed so as to be separated from one another at predetermined intervals (uniform intervals) at predetermined positions of the reel gear 44.

As shown in detail in FIG. 5 and FIG. 8, the reel plate 46, that is an annular metal plate formed of a magnetic material, is fixed coaxially and integrally to the floor wall 42 of the lower flange 40 by insert molding, at the radial direction inner side of the reel gear 44.

The plural (four in the illustrated structure) small holes 56 serving as fixing portions are formed in the reel plate 46 so as to be separated from one another at predetermined intervals (uniform intervals) in the peripheral direction. Step portions 57, that are such that the diameters of the openings at the lower sides of the small holes 56 are greater than the diameters of the openings at the upper sides thereof, are formed at the inner peripheral surfaces of the small holes 56 (see FIG. 9 through FIG. 12). Accordingly, after the reel plate 46 is set within an unillustrated mold, the resin material for molding enters into the small holes 56 and flows around to the bottom surfaces of the step portions 57 and hardens. The reel plate 46 is thereby fixed to the floor wall 42.

A pass-through hole 50, through which a clutch member 84 that is described below is inserted, is formed in the center (the axially central portion) of the floor wall 42 of the lower flange 40. The boss portion 54 for a clutch, that is shaped as a short cylindrical tube and serves as a position restricting portion, stands erect upwardly along the edge portion of the pass-through hole 50. The boss portion 54 for a clutch is described together with the clutch member 84 that is described below. Note that the axially central portion of the reel plate 46 is a through-hole 46A. As shown in FIG. 9 through FIG. 12, the inner diameter of the through-hole 46A is formed to be slightly smaller than the inner diameter of the pass-through hole 50.

Figure 7:
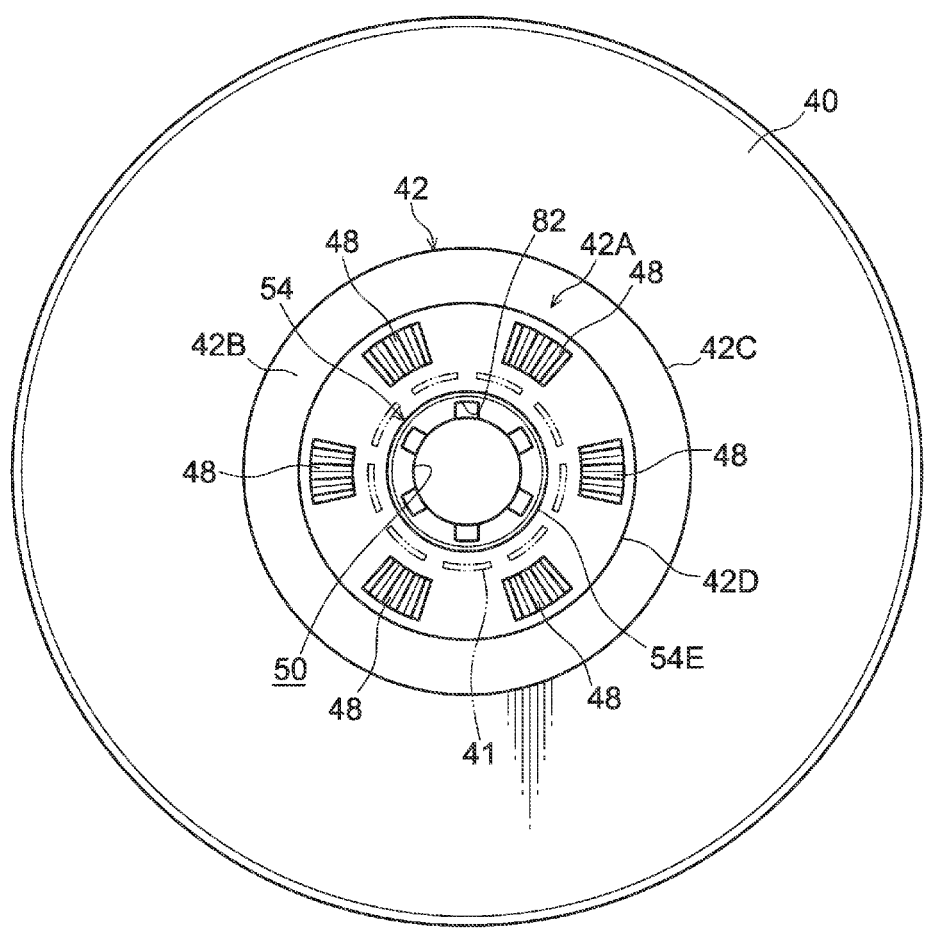
FIG. 7 is a schematic plan view of a lower flange.

As shown in detail in FIG. 4 and FIG. 7, the plural (six in the illustrated structure) engaging gears 48, that are coaxial with the reel hub 32 and are divided into sections, are formed so as to project from the floor wall 42 further at the radial direction inner side than the step portion 42A, so as to be separated from one another at predetermined intervals (uniform intervals). The engaging gears 48 are inserted through the pass-through holes 35, that are formed in the annular extending portion 36 of the reel hub 32, and project upward. The engaging gears 48 can mesh with a braking gear 66 of a braking member 60 that is described below.

Plural standing ribs 52 (see FIG. 11), that run along the axial direction of the reel 30, are formed at the inner peripheral surface of the cylindrical tube portion 34 of the reel hub 32, at uniform intervals in the peripheral direction. The projecting lengths of the standing ribs 52 in the radial direction are determined such that the standing ribs 52 are adjacent to the outer peripheral edge of a flat plate portion 64 (described below) of the braking member 60 that is positioned at a rotation locking position. Upper portions of the standing ribs 52 are notched so that the interval between the standing ribs 52 and the outer peripheral edge of the braking member 60 positioned at a rotation permitting position is greater than or equal to a predetermined value.

Further, as shown in FIG. 2 and FIG. 3, the reel 30 is accommodated in the case 12, and is placed on the annular rib 22 when not in use. Specifically, radial direction movement of the reel 30 is restricted due to the outer side portions of the taper portions 43 at the floor wall 42 abutting the top end surface of the annular rib 22, and the inner edge portion of the upper end of the annular rib 22 being made to be a taper surface 22A that corresponds to the taper portions 43. Further, this is a structure that prevents entry of dust and the like therefrom.

In this state, the reel 30 overall is positioned within the case 12, and the reel gear 44 and the reel plate 46 are exposed from the gear opening 20 (see FIG. 1B). Namely, the reel gear 44 does not project-out from the outer surface (bottom surface) of the floor plate 16A, and looks out onto the exterior of the case 12 from the gear opening 20. Further, the pass-through hole 50 looks out onto the gear opening 20 through the through-hole 46A of the reel plate 46.

Due thereto, operation of the reel 30, i.e., chucking (holding) and driving and rotating, are possible from the exterior of the case 12. Further, in this state, an annular restricting rib 58, that stands erect from the ceiling plate 14A, is disposed at the radial direction inner side of the upper end portion side of the reel hub 32 (the cylindrical tube portion 34). The outer peripheral surface of the restricting rib 58 is adjacent to the inner peripheral surface of the reel hub 32 (the cylindrical tube portion 34). The restricting rib 58 thereby suppresses joggling of the reel 30 within the case 12.

Further, the recording tape cartridge 10 has the braking member 60 that serves as a braking means that impedes rotation of the reel 30 at times of non-use. The braking member 60 has a base portion 62. The base portion 62 is formed substantially in the shape of a cylindrical tube having a floor that opens downward. The flat plate portion 64, that is formed in an annular shape, extends outwardly in the radial direction over the entire periphery, from the axial direction intermediate portion of the outer peripheral portion of the base portion 62. The braking gear 66 is provided over the entire periphery at the bottom surface of the flat plate portion 64. Namely, the braking gear 66 is formed overall in an annular shape, and can mesh-together with the engaging gears 48 of the reel 30.

A sliding-contact projecting portion 68 projects-out at the axially central portion of the bottom surface of the base portion 62. The distal end portion of the sliding-contact projecting portion 68 is formed to be substantially spherical, and substantially point-contacts the clutch member 84 that is described below. On the other hand, a cross-shaped projection 70, at whose interior is formed a groove that is substantially cross-shaped as seen in plan view, stands erect at the top surface of the base portion 62. Further, an annular rib 72 stands erect at the top surface of the base portion 62. The top surface of the base portion 62 between the rib 72 and the cross-shaped projection 70 is a spring receiving surface 74 that is abutted by one end portion of a compression coil spring 76 that is described below.

The braking member 60 that is structured in this way is substantially coaxially inserted within the cylindrical tube portion 34 of the reel hub 32, so as to be movable in the vertical direction (the axial direction of the reel 30). Namely, due to the braking member 60 moving in the vertical direction, the braking member 60 can assume a position (rotation locking position), at which the braking gear 66 thereof meshes-together with the engaging gears 48 of the reel 30, and a position (rotation permitting position) at which this meshing-together is cancelled.

A cross-shaped rib 80, that projects downward from the ceiling plate 14A of the case 12, is disposed within the groove of the cross-shaped projection 70 of the braking member 60. The cross-shaped rib 80 is shaped as a detent at which two thin plate pieces intersect one another orthogonally. Due to the cross-shaped rib 80 engaging with the groove walls of the cross-shaped projection 70, rotation of the braking member 60 with respect to the case 12 is impeded. Accordingly, the braking member 60 can impede rotation of the reel 30 due to the braking gear 66 of the braking member 60 being meshed-together with the engaging gears 48 of the reel 30.

Note that the state in which the cross-shaped rib 80 is disposed within the groove is maintained over the entire vertical direction moving stroke of the braking member 60, and the cross-shaped rib 80 also functions to guide the direction of movement of the braking member 60 in the vertical direction. Further, the compression coil spring 76, that can be interpreted in a broad sense as an urging means, is disposed between the ceiling plate 14A and the spring receiving surface 74 of the braking member 60. One end portion of the compression coil spring 76 abuts the spring receiving surface 74, and the other end portion thereof abuts the ceiling plate 14A. This other end portion is positioned at the inner side of an annular wall portion 78, that projects-out at the ceiling plate 14A at the outer side of the cross-shaped rib 80, such that the position does not become offset in the radial direction.

Due to the urging force of the compression coil spring 76, the braking member 60 is urged downward, and at times of non-use when the recording tape cartridge 10 is not loaded in a drive device, the braking gear 66 is made to mesh-together with the engaging gears 48 such that inadvertent rotation of the reel 30 is prevented (the braking member 60 is positioned at the rotation locking position). Further, due to this urging force, the reel 30, that is meshed-together with the braking member 60 at the engaging gears 48, also is urged downward and abuts the annular rib 22 so as to not joggle within the case 12.

The recording tape cartridge 10 has the clutch member 84 serving as a releasing member that is operated from the exterior when the locked state of the reel 30 by the braking member 60 is to be cancelled. Accompanying the operation of the reel gear 44 meshing-together with the driving gear 108 of the drive device, the clutch member 84 is pushed by a releasing projection 110 of the drive device that is described below, so as to move upward, and is disposed between the floor wall 42 of the reel 30 and the braking member 60.

Namely, the clutch member 84 is substantially formed in the shape of a solid cylinder that is inserted through the through-hole 46A and the pass-through hole 50. The outer diameter of the clutch member 84 is formed to be substantially the same as the inner diameter of the through-hole 46A of the reel plate 46, i.e., slightly smaller than the inner diameter of the pass-through hole 50 that coincides with the inner diameter of the boss portion 54 for a clutch.

Further, the flat top end surface of the axially central portion of the clutch member 84 is a sliding-contact surface 86 that always abuts the sliding-contact projecting portion 68 of the braking member 60. The flat bottom end surface of the clutch member 84, that is around a lightening hole provided so as to open downward, is a pushing/operating surface 88. Accordingly, when the pushing/operating surface 88 of the clutch member 84 is pushed, the clutch member 84 moves upward against the urging force of the compression coil spring 76, and moves the braking member 60 to the rotation permitting position.

The clutch member 84 has rotation restricting ribs 90 that jut-out at the radial direction outer side of the outer peripheral surface of the clutch member 84. A plurality (six in the illustrated structure) of the rotation restricting ribs 90 are provided at uniform intervals in the peripheral direction of the clutch member 84, and are disposed radially as seen in plan view. The rotation restricting ribs 90 project-out further upward than the sliding-contact surface 86, so as to be spread over (be continuous with both) the top end surface of the clutch member 84 around the sliding-contact surface 86 and the outer peripheral surface in a vicinity of that top end surface.

The rotation restricting ribs 90 are respectively disposed in rotation restricting grooves 82 (see FIG. 4, FIG. 7, and FIG. 9 through FIG. 12) that are recessed in the inner edge portion of the boss portion 54 for a clutch. Namely, a plurality (six in the illustrated structure) of the rotation restricting grooves 82 are provided at uniform intervals in the peripheral direction of the boss portion 54 for a clutch, and open upward at the top end of the boss portion 54 for a clutch. Due thereto, the clutch member 84 can move in the vertical direction while, at the rotation restricting ribs 90 thereof, being guided by the rotation restricting grooves 82 of the boss portion 54 for a clutch.

The rotation restricting ribs 90 maintain the state of being disposed in the rotation restricting grooves 82 of the boss portion 54 for a clutch, also when the clutch member 84 moves upward and positions the braking member 60 at the rotation permitting position. Due thereto, the clutch member 84 cannot rotate relative to the reel 30, i.e., always rotates integrally with the reel 30. Further, because the rotation restricting grooves 82 are closed-off at the lower end portion of the boss portion 54 for a clutch, the clutch member 84 is prevented from falling-out from the reel hub 32 by the rotation restricting ribs 90 and the rotation restricting grooves 82.

Figure 12:
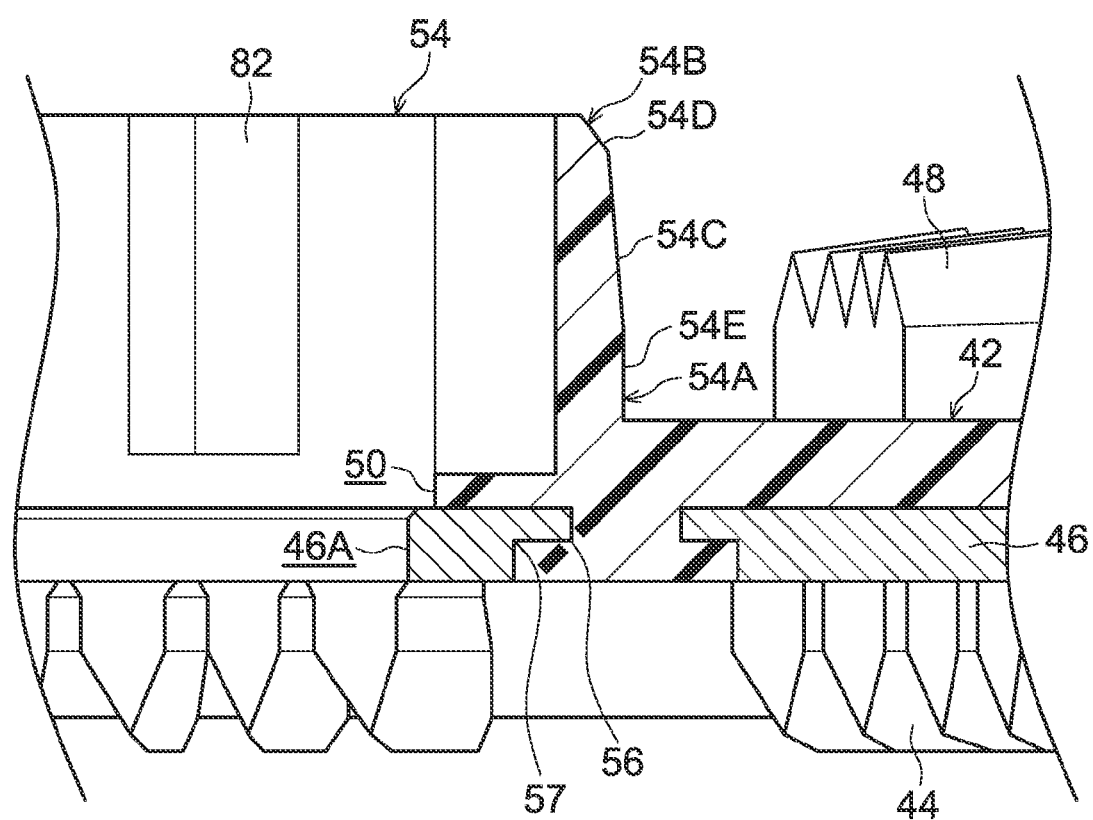
FIG. 12 is a partial, enlarged schematic sectional view of the lower flange.

As shown in detail in FIG. 12, the lower portion 54A (the outer peripheral surface 54E) of the boss portion 54 for a clutch is a substantial position restricting portion that projects-out vertically at the top surface of the floor wall 42. The outer peripheral surface of an upper portion 54B side that is continuous therewith is an inclined surface 54C whose outer diameter decreases toward the upper side. Note that, at the boss portion 54 for a clutch shown in FIG. 12, an inclined surface 54D, whose angle of inclination is greater than the angle of inclination of the inclined surface 54C, is formed at the outer peripheral surface of the upper portion 54B so as to be continuous with the inclined surface 54C. However, the boss portion 54 for a clutch is not limited to the same, and, for example, may be structured to have an outer peripheral surface that is an inclined surface that is inclined at a predetermined angle from the upper portion 54B to the lower portion 54A.

As shown in FIG. 2 and FIG. 3, the rotating shaft 100 of the drive device has a rotating shaft portion 102. A disc-shaped rotating table 104 is provided integrally and coaxially with the top end of the rotating shaft portion 102. The driving gear 108, that can mesh-together with the reel gear 44 of the recording tape cartridge 10, is formed in an annular form at the top surface of and at the outer peripheral edge portion of the rotating table 104. Further, a magnet 106, that is substantially formed in the shape of a disc, is disposed coaxially at the top surface of the rotating table 104, at the radial direction inner side of the driving gear 108. The releasing projection 110, that abuts the pushing/operating surface 88 of the clutch member 84, is formed at the axially central portion of the rotating table 104.

Next, operation of the recording tape cartridge 10 and the reel 30 relating to the present exemplary embodiment is described. At the recording tape cartridge 10, when the recording tape cartridge 10 is not in use, due to the urging force of the compression coil spring 76, the braking member 60 is positioned at the rotation locking position and causes the braking gear 66 to mesh-together with engaging gears 48. Therefore, rotation of the reel 30 with respect to the case 12 is impeded. At this time, the reel gear 44 of the reel 30 is exposed from the gear opening 20, and the clutch member 84 is inserted through the pass-through hole 50 and the through-hole 46A and faces out onto the gear opening 20.

On the other hand, when the recording tape T is to be used, the recording tape cartridge 10 is loaded along the direction of arrow A into a bucket (not shown) of the drive device. Then, when the recording tape cartridge 10 is loaded to a predetermined depth in the bucket, the bucket is lowered, and the rotating shaft 100 of the drive device relatively approaches the gear opening 20 of the case 12 (moves upward) and holds the reel 30. Specifically, the rotating shaft 100 causes the driving gear 108 thereof to mesh with the reel gear 44, while attracting and holding the reel plate 46 by the magnet 106 in a non-contact state.

Accompanying the meshing-together of the reel gear 44 and the driving gear 108, i.e., the relative movement of the rotating shaft 100 with respect to the case 12 in the direction of approaching the case 12 along the axial direction, the releasing projection 110 of the rotating shaft 100 abuts the pushing/operating surface 88 of the clutch member 84, and pushes the clutch member 84 upward against the urging force of the compression coil spring 76. Due thereto, the braking member 60, that is abutting the clutch member 84 at the sliding-contact projecting portion 68, also moves upward, the meshing-together of the braking gear 66 and the engaging gears 48 is cancelled, and the braking member 60 moves to the rotation permitting position relative to the reel 30.

Namely, when the rotating shaft 100 moves upward relatively, the reel 30 is brought upward together with the clutch member 84 and the braking member 60 (with their relative positions remaining unchanged) against the urging force of the compression coil spring 76. The braking member 60 reaches the rotation permitting position (with respect to the case 12), and the lower flange 40 separates from the annular rib 22 (the taper surface 22A). Due thereto, the reel 30 rises-up within the case 12, and becomes able to rotate in a state of not contacting the inner surfaces of the case 12.

Further, at this time, due to the bucket, i.e., the recording tape cartridge 10 being lowered within the drive device, the positioning pins of the drive device enter into the positioning holes 24, 26 of the case 12 respectively, and the reference surfaces of the drive device abut the reference surfaces 24A, 26A of the case 12. Due thereto, the recording tape cartridge 10 is positioned in the horizontal direction and in the vertical direction with respect to the drive device. Then, the pull-out means of the drive device, while engaging with the engaging recess 28A of the leader block 28, takes the leader block 28 out from the case 12 and guides the leader block 28 to the take-up reel of the drive device.

Then, the leader block 28 is fit into the reel hub of the take-up reel, and the arc-shaped surface 28B thereof structures a portion of the take-up surface on which the recording tape T is taken-up. In this state, when the leader block 28 rotates integrally with the take-up reel, the recording tape T is pulled-out from the case 12 through the opening 18, while being taken-up onto the reel hub of the take-up reel. Note that, at this time, the reel 30 of the recording tape cartridge 10 rotates synchronously with the take-up reel due to the rotational force of the rotating shaft 100 that is transmitted by the driving gear 108 that is meshed-together with the reel gear 44.

Then, recording of information onto the recording tape T, or playback of information recorded on the recording tape T, is carried out by a recording/playback head (not shown) that is disposed along a predetermined tape path of the drive device. Note that, at this time, the sliding-contact projecting portion 68 of the braking member 60, that cannot rotate with respect to the case 12, slidingly-contacts the sliding-contact surface 86 of the clutch member 84 that rotates together with the reel 30 with respect to the case 12. Namely, the clutch member 84 is structured such that, in the state in which the reel gear 44 is meshed-together with the driving gear 108, the state of abutment of the clutch member 84 with the releasing projection 110 at the pushing/operating surface 88 of the clutch member 84 is maintained, and the clutch member 84 holds the braking member 60 at the rotation permitting position.

Further, when the reel 30 rotates, there is no relative rotation between the clutch member 84, that rotates integrally with the reel 30, and the rotating shaft 100, that drives the reel 30, and the pushing/operating surface 88 and the releasing projection 110 do not slidingly-contact one another. The sliding-contact surface 86 of the clutch member 84 and the sliding-contact projecting portion 68 of the braking member 60, that cannot rotate with respect to the case 12, slidingly-contact one another. In this way, because there is no relative rotation between the rotating shaft portion 102 and the clutch member 84, the problem of the releasing projection 110 or the pushing/operating surface 88 becoming worn does not arise.

On the other hand, when the recording of information onto the recording tape T or the playback of information recorded on the recording tape T is finished, the recording tape T is rewound onto the reel 30, and the leader block 28 is held in a vicinity of the opening 18 of the case 12. Then, the bucket in which the recording tape cartridge 10 is loaded rises. Thus, the meshing-together of the reel gear 44 and the driving gear 108 is cancelled, the abutment of the releasing projection 110 and the pushing/operating surface 88 of the clutch member 84 is cancelled, and the clutch member 84 moves downward together with the braking member 60 (with the state of abutment thereof maintained) due to the urging force of the compression coil spring 76.

Due thereto, the braking gear 66 of the braking member 60 meshes-together with the engaging gears 48, and the braking member 60 returns to the rotating locking position at which the braking member 60 impedes rotation of the reel 30 with respect to the case 12. Further, accompanying the operation of the braking member 60 and the clutch member 84 moving due to the urging force of the compression coil spring 76, the reel 30 also moves downward. While the lower flange 40 of the reel 30 is made to abut the annular rib 22, the reel gear 44 is returned to its initial state of being exposed from the gear opening 20. In this state, the recording tape cartridge 10 is ejected from the drive device (bucket).

Operation of the reel 30 relating to the present exemplary embodiment is described in further detail. The reel 30 is structured such that the upper flange 38 and the reel hub 32 are molded integrally, and the lower flange 40 having the floor wall 42 is welded to the reel hub 32 with which the upper flange 38 is molded integrally. Further, the reel plate 46 is integrally fixed by insert molding in advance to the bottom surface (outer surface) side of the floor wall 42 of the lower flange 40, and the strength (rigidity) of the floor wall 42 is ensured.

At the time of welding the lower flange 40 to the reel hub 32, while the boss portion 54 for a clutch, that projects at the center of the top surface the floor wall 42, is inserted through the pass-through hole 37 formed in the center of the floor wall of the reel hub 32 and the engaging gears 48 are inserted through the pass-through holes 35 formed in the annular extending portion 36, the bottom surface 36B of the step portion 36A is made to abut the top surface 42B of the step portion 42A, and the EDs 41, that project at the welding surface of the annular extending portion 36 of the reel hub 32, are made to contact the surface to be welded of the floor wall 42 of the lower flange 42. Namely, the bottom surface of the annular extending portion 36, that is further toward the radial direction inner side than the pass-through holes 35, is made to abut the top surface of the floor wall 42 that is further toward the radial direction outer side than the boss portion 54 for a clutch.

Next, an unillustrated horn is inserted through the interior of the reel hub 32 (the cylindrical tube portion 34) and made to abut the top surface of the annular extending portion 36 further toward the radial direction inner side (the reel 30 central side) than the pass-through holes 35, and the EDs 41 are fused by ultrasonic waves generated from the horn. Due thereto, the lower flange 40 is welded to the reel hub 32, and the reel 30 is manufactured. When the welding surface of the reel hub 32 is superposed on the surface to be welded of the lower flange 40, the region where the EDs 41 are provided at the welding surface of the reel hub 32 is within the region where the reel plate 46 exists, and is the region (the flat region) other than the small hole 56 portions that are for fixing the reel plate 46 to the floor wall 42.

Namely, as shown in FIG. 6 through FIG. 8 for example, the region where the EDs 41 are provided is, in plan view or in bottom view, a region that is between the outer peripheral edge portion 46B and the inner peripheral edge portion 46C of the reel plate 46, and between the pass-through holes 35 (the engaging gears 48) and the pass-through hole 37, and further toward the radial direction outer side than the small hole 56 portions. This is because, in a case in which the reel plate 46 is fixed to the bottom surface (outer surface) of the floor wall 42 by insert molding, the resin material, that flows around to and hardens at the bottom surfaces of the step portions 57, projects-out downwardly in convex shapes from the small holes 56.

Namely, this is because, if the region where the EDs 41 are provided is within the region where the reel plate 46, that is fixed to the lower flange 40 (the floor wall 42), exists and is the region other than the small hole 56 portions, an unillustrated receiving stand can be structured so as to not exist directly beneath these small hole 56 portions (the receiving stand can be structured so as to be able to support only the flat region of the reel plate 46), and the flatness of the lower flange 40 (the floor wall 42) with respect to the receiving stand can be ensured.

Accordingly, even if there are convex portions (the small hole 56 portions or the like) at the surface of the reel plate 46, when the lower flange 40 (the floor wall 42) is set at the receiving stand, the problem of the lower flange 40 tilting with respect to the receiving stand does not arise, and the welding accuracy (the accuracy of welding the lower flange 40 with respect to the reel hub 32) at the time of carrying out welding with the welding surface of the reel hub 32 superposed on the surface to be welded of the lower flange 40, can be improved.

In a case in which the engaging gears 48 are provided at the top surface of the annular extending portion 36 of the reel hub 32 and the floor wall 42 of the lower flange 40 is welded to the bottom surface of the annular extending portion 36, it is difficult to make the accuracy of the engaging gears 48, and, in particular, the heights thereof from the reel gear 44, uniform due to warping of the welding region and dispersion in the welded amounts.

However, in the reel 30 relating to the present exemplary embodiment, the engaging gears 48 are formed at the floor wall 42 of the lower flange 40 and not at the annular extending portion 36. Therefore, warping of the welding region and dispersion in the welded amounts does not affect the engaging gears 48, and the accuracy of the engaging gears 48 (the heights thereof from the reel gear 44) can be made to be uniform.

Namely, in the reel 30 relating to the present exemplary embodiment, because the engaging gears 48 are separated from the welding region (the weld surface), dispersion at the time of welding of the engaging gears 48, of which dimensional accuracy is required, can be eliminated, and the engaging gears 48 can be made to accurately engage with the braking member 60. Note that, although the annular extending portion 36 has the pass-through holes 35 through which the engaging gears 48 are inserted, the annular extending portion 36 is formed in an annular form at the lower end portion of the reel hub 32, and therefore, the problem of the strength of the annular extending portion 36 deteriorating does not arise.

At the time of welding the reel hub 32 and the lower flange 40, the bottom surface 36B of the step portion 36A, that is formed at the annular extending portion 36 of the reel hub 32, abuts the top surface 42B (reference surface) of the step portion 42A formed at the floor wall 42 of the lower flange 40. Accordingly, the lower flange 40 (the floor wall 42 including the reel gear 44) can be welded while being positioned (while the position thereof is prescribed) accurately in the heightwise direction (the vertical direction) with respect to the reel hub 32 (the upper flange 38), and the coaxiality of the reel gear 44 and the reel hub 32 can be ensured well.

Figure 10:
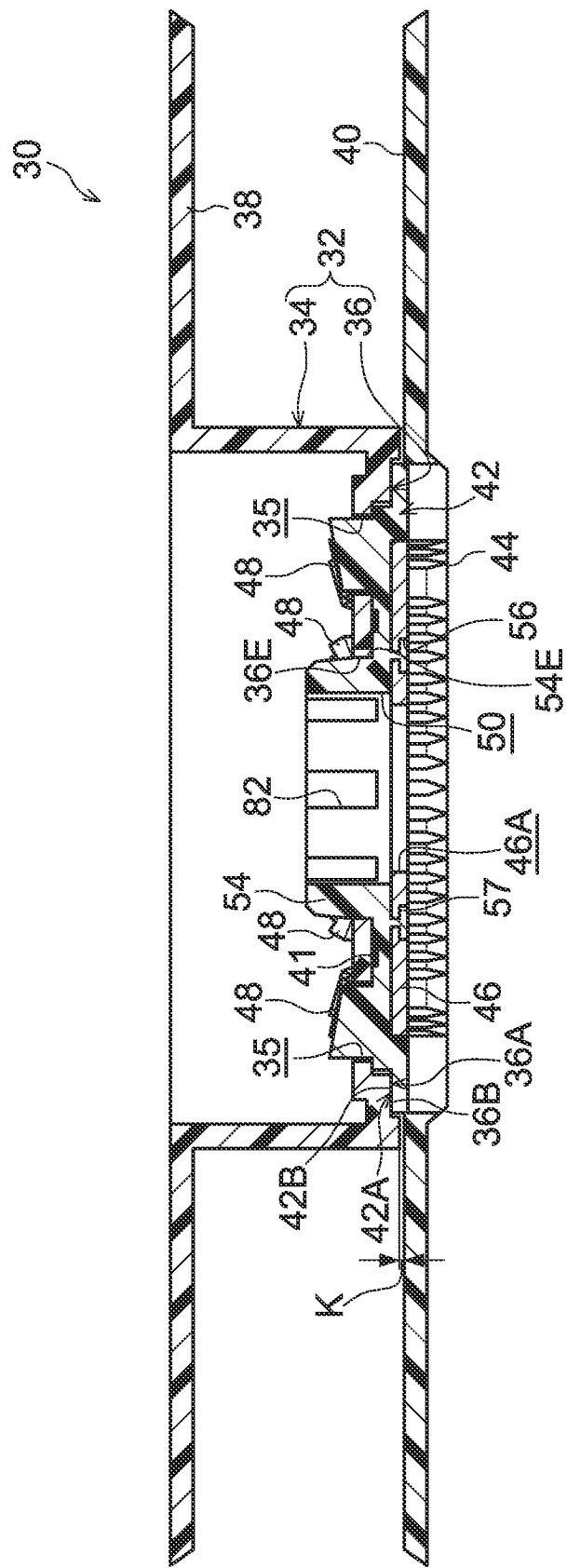
FIG. 10 is a schematic sectional view of the reel.

At this time, as shown in FIG. 10, the bottom end portion of the reel hub 32 (the cylindrical tube portion 34) is structured so as to not abut the top surface of the lower flange 40 (the slight clearance K is formed between the bottom end portion of the cylindrical tube portion 34 and the top surface of the lower flange 40). Accordingly, parallelism of the upper flange 38 and the lower flange 40 after welding can be ensured, and it is possible to make it such that vibrations are not directly transferred from the reel hub 32 to the lower flange 40 at the time when the reel 30 rotates (the transfer of vibrations can be cut-off). Therefore, the surface wobbling width (deformation) of the lower flange 40 can be curbed.

Further, the plate thickness D2 of the annular extending portion 36 other than the step portion 36A is made to be smaller than the plate thickness D1 of the cylindrical tube portion 34. Therefore, the reel hub 32 (the cylindrical tube portion 34) can elastically (flexurally) deform toward the radial direction inner side due to the pressure caused by tight winding of the recording tape T. Moreover, the positioning, in the radial direction, of the lower flange 40 (the floor wall 42) with respect to the reel hub 32 is carried out further toward the radial direction inner side than the welding region by the EDs 41, and positioning (restricting of the position) in the radial direction is not carried out at the radial direction outer side of this welding region.

Concretely, the positioning, in the radial direction, of the lower flange 40 (the floor wall 42) with respect to the reel hub 32 is carried out by the boss portion 54 for a clutch, that projects at the center of the top surface of the floor wall 42, being inserted through the pass-through hole 37 formed in the center of the floor wall of the reel hub 32. The predetermined clearances J1, J2 are formed between the inner peripheral surfaces 36C, 36D of the step portion 36A at the annular extending portion 36 and the outer peripheral surfaces 42C, 42D of the step portion 42A at the floor wall 42, respectively.

Accordingly, at the radial direction outer side of the region of welding with the floor wall 42, elastic deformation toward the radial direction inner side of the reel hub 32 (the cylindrical tube portion 34) is not restricted by the floor wall 42. In other words, even if the reel hub 32 (the cylindrical tube portion 34) elastically deforms toward the radial direction inner side due to pressure caused by tight winding of the recording tape T, the inner peripheral surfaces 36C, 36D of the step portion 36A do not contact the outer peripheral surfaces 42C, 42D of the floor wall 42 respectively, due to the clearances J1, J2. It therefore can be said that the cylindrical tube portion of the hub can freely deform toward the radial direction inner side of the hub, at the radial direction outer side of the welded region.

Accordingly, the elastic deformation of the reel hub 32 (the cylindrical tube portion 34) is not hindered by the floor wall 42, and, in the heightwise direction (the transverse direction of the recording tape T), the reel hub 32 (the cylindrical tube portion 34) elastically deforms uniformly vertically (so as to become a shape that is symmetrical vertically). Due thereto, regardless of the environment in which the recording tape cartridge 10 is stored, deformation of the recording tape T that is in a state of being wound around the reel 30 can be suppressed, and, when the recording tape cartridge 10 is stored over a long period of time or the like, deterioration in the performance of the recording tape T can be prevented.

In particular, in the present exemplary embodiment, the region of welding the floor wall 42 of the lower flange 40 to the annular extending portion 36 of the reel hub 32 is further toward the radial direction inner side than the reel gear 44, i.e., is above a region where the reel plate 46 exists. Therefore, elastic deformation of the reel hub 32 (the cylindrical tube portion 34) at the radial direction outer side of the reel plate 46 (the reel gear 44) is not impeded. Accordingly, the reel hub 32 elastically deforms uniformly vertically in the heightwise direction thereof (the transverse direction of the recording tape T), and the balance of rigidity in the vertical direction is maintained.

Further, the inclined surface 54D and the inclined surface 54C are formed at the upper portion 54B of the boss portion 54 for a clutch. Therefore, when the boss portion 54 for a clutch is inserted in the pass-through hole 37, the radial direction inner side end surface 36E of the annular extending portion 36 that structures the pass-through hole 37 is guided well. Accordingly, assembly of the lower flange 40 to the reel hub 32 is easy, and positioning of the lower flange 40 with respect to the reel hub 32 in the radial direction can be carried out easily.

Note that, in the present exemplary embodiment, the boss portion 54 for a clutch (the lower portion 54A) is made to be a position restricting portion, but the position restricting portion is not limited to the same. For example, other than the boss portion 54 for a clutch, a convex portion (not shown) may be provided so as to project-out at the top surface of the floor wall 42, and the position of the radial direction inner side end surface 36E of the annular extending portion 36 may be restricted thereby.

Further, the abutting portion that abuts, from the radial direction outer side, the position restricting portion (the boss portion 54 for a clutch) that is provided at the floor wall 42, does not have to be the radial direction inner side end surface 36E of the annular extending portion 36. For example, a step-shaped region may be formed at the annular extending portion 36, and this region may abut the position restricting portion that is provided at the floor wall 42.

In this case, the position restricting portion may be formed in a step shape corresponding to the step-shaped region of the annular extending portion 36. Note that "abutting" here means causing contact in order for movement toward the radial direction inner side to be restricted, but this is a state in which there is a slight gap, and a state in which movement toward the radial direction inner side is substantially restricted also is included.

Namely, at the radial direction inner side of the welding region of the reel hub 32 (the annular extending portion 36) and the lower flange 40 (the floor wall 42), the region where the clearance between the both is a minimum is the position restricting portion (positioning region), in the radial direction, of the lower flange 40 (the floor wall 42) with respect to the reel hub 32 (the annular extending portion 36).

Further, in the above-described exemplary embodiment, the EDs 41 are structured so as to project at the annular extending portion 36 of the reel hub 32. However, the EDs 41 may be structured so as to project at the floor wall 42 of the lower flange 40. Moreover, although the illustrated EDs 41 are disposed further toward the radial direction outer side than the small holes 56, the EDs 41 may be disposed at the radial direction inner side of the small holes 56, depending on the positions where the small holes 56 are provided. Namely, the positions of the small holes 56 may be changed appropriately in accordance with the design.

In the above-described exemplary embodiment, the leader block 28 is used as the leader member, but the leader member is not limited to the same and may be, for example, a substantially solid-cylindrical leader pin (not shown). In this case, the case 12 may be structured to have a covering member (a sliding door or the like that moves along a predetermined straight line or circular arc: not shown) that opens and closes the opening 18.

Moreover, it suffices for the recording tape T to be interpreted as an elongated-tape-shaped information recording/playback medium onto which information can be recorded and from which recorded information can be played-back. It goes without saying that the recording tape cartridge 10 (the reel 30) relating to the present exemplary embodiment can be applied as well to recording tapes T of any recording/playback systems.

What is claimed is:

1. A reel comprising:
a hub that is formed of resin and that has a cylindrical tube portion on whose outer peripheral surface a recording tape is wound, an extending portion that extends from an inner peripheral edge of a lower end portion of the cylindrical tube portion toward a radial direction inner side, and an abutting portion provided at the extending portion;
an upper flange that is provided integrally so as to extend from an outer peripheral edge of an upper end portion of the cylindrical tube portion toward a radial direction outer side;
a lower flange that is formed of resin, and that is provided at the radial direction outer side of an outer peripheral edge of the lower end portion of the cylindrical tube portion so as to face the upper flange; and
a floor wall that is provided integrally at the radial direction inner side of the lower flange, and that has a position restricting portion that restricts a radial direction position of the abutting portion from the radial direction inner side, and a region of the floor wall, which region is between the cylindrical tube portion and the position restricting portion, is welded to the extending portion; wherein the cylindrical tube portion of the hub can freely deform toward the radial direction inner side of the hub, at the radial direction outer side of the welded region.

2. The reel of claim 1, wherein the abutting portion is a radial direction inner side end surface of the extending portion, and, due to the position restricting portion being inserted through a pass-through hole that is structured by the end surface, the position restricting portion restricts a radial direction position of the end surface from the radial direction inner side.

3. The reel of claim 2, wherein an inclined surface that guides the end surface is formed at an upper portion of the position restricting portion.

4. The reel of claim 1, wherein a gear for rotating and driving is formed at a bottom surface of the floor wall, and a welding region at the floor wall is further toward the radial direction inner side than the gear for rotating and driving.

5. The reel of claim 4, wherein a reel plate formed of metal is fixed to the floor wall at the radial direction inner side of the gear for rotating and driving, and the welding region at the floor wall is positioned above a region where the reel plate exists.

6. The reel of claim 1, wherein a reference surface, that prescribes a heightwise direction position of the hub, is formed at the floor wall.

7. The reel of claim 1, wherein a first step portion, that is annular and swells upward in a step shape, is formed at a bottom surface of the extending portion, and a second step portion, that is annular and abuts a bottom surface of the first step portion, is formed at a top surface of the floor wall corresponding to the first step portion, and predetermined clearances are formed between an inner peripheral surface at the radial direction outer side of the first step portion and an outer peripheral surface at the radial direction outer side of the second step portion, and between an inner peripheral surface at the radial direction inner side of the first step portion and an outer peripheral surface at the radial direction inner side of the second step portion, respectively.

8. A recording tape cartridge comprising:
the reel of claim 1 on which a recording tape is wound;
a case that singly accommodates the reel; and
a leader member attached to an end portion of the recording tape and able to be pulled-out from an opening formed in the case.

9. The reel of claim 1, wherein a clearance is formed between the lower flange and the extending portion of the hub, at a portion where the lower flange and the extending portion face in a radial direction.

* * * * *